United States Patent [19]

Musetti

[11] Patent Number: 4,887,551
[45] Date of Patent: * Dec. 19, 1989

[54] RETRACTABLE LEASH

[76] Inventor: Louis J. Musetti, 480 Hoffman Ave., Monterey, Calif. 93490

[*] Notice: The portion of the term of this patent subsequent to Jun. 7, 2005 has been disclaimed.

[21] Appl. No.: 129,594

[22] Filed: Dec. 7, 1987

Related U.S. Application Data

[63] Continuation-in-part of Ser. No. 887,538, Jul. 21, 1986, Pat. No. 4,692,977, and a continuation-in-part of Ser. No. 750,501, Jul. 1, 1985, abandoned.

[51] Int. Cl.$^4$ ............................................. A01K 1/00
[52] U.S. Cl. ................... 119/109; 242/107.3; 242/107.6
[58] Field of Search ............... 119/106, 109; 242/107, 242/107.3, 107.4 R, 107.6; 254/364

[56] References Cited

U.S. PATENT DOCUMENTS

| 3,064,356 | 11/1962 | Kruse | 242/107.3 |
|---|---|---|---|
| 3,233,591 | 2/1966 | Rogers et al. | 242/107.3 |
| 3,332,638 | 7/1967 | Jessup et al. | 242/107.3 |
| 3,381,916 | 5/1968 | Edgell | 242/107.3 |
| 3,480,227 | 11/1969 | Matthews | 242/107.3 |
| 4,114,736 | 9/1978 | Scherenberg | 242/107.3 X |
| 4,194,703 | 3/1980 | Roe | 242/107.3 X |
| 4,446,884 | 5/1984 | Rader, Jr. | 242/107.3 X |
| 4,543,806 | 10/1985 | Papandrea et al. | 242/107.6 X |
| 4,748,937 | 6/1988 | Musetti | 119/109 |

Primary Examiner—Robert Peshock
Assistant Examiner—R. Thomas Price
Attorney, Agent, or Firm—Sanford Astor

[57] ABSTRACT

This invention relates to a leash which coils up automatically when the handle is released. The invention comprises a generally cylindrical center portion with handles on either side, which is manufactured in two parts and can be assembled easily. The two parts are then sonically sealed to provide a strong and secure body. A retractable spring is fixedly attached inside the body in such a manner that it easily pulls out and retracts without catching or snagging.

21 Claims, 1 Drawing Sheet

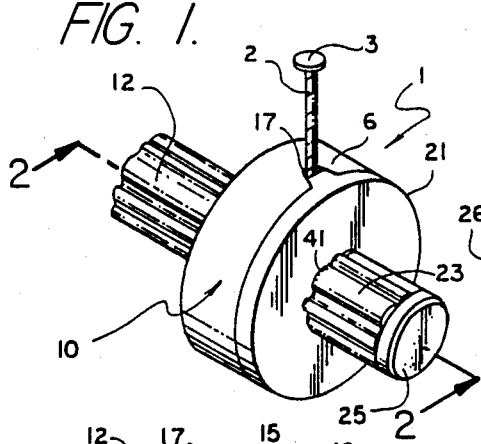
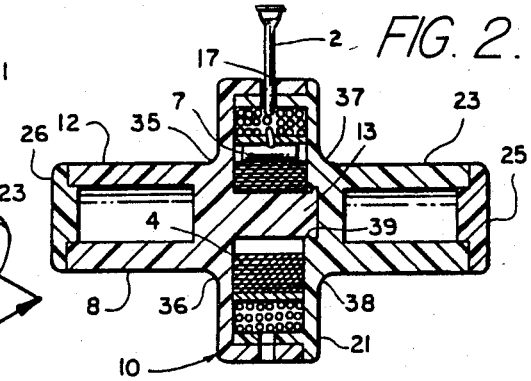
FIG. 1.
FIG. 2.
FIG. 3.
FIG. 4.

RETRACTABLE LEASH

This application is a continuation-in-part of my copending application No. 06/887,538 filed July 21, 1986 Pat. No. 4,692,977, and a continuation-in-part of my earlier application No. 06/750,501 filed July 1, 1985, now abandoned.

BACKGROUND OF THE INVENTION

This invention relates generally to leashes and most specifically to retractable animal leashes, although the invention has application to use on things such as skateboards and surfboards and like devices.

With reference to animals and pets, most pet owners are either required to keep their pets on a leash or desire to do so to keep their pet under control. Normally, available leashes are in the form of some type of length of chain, strap or cord. Each time the owner wishes to take the animal out on the leash, he must find a leash and attach it to the pet's collar.

If the pet owner desires to release the animal at some location, he must unclip the leash from the animal's collar and allow the animal to roam free. At the time that he wishes to leash the animal again, he must reclip the leash to the collar. In some cases, in order to avoid unclipping the leash, the owner will allow the animal to roam free with the leash attached. This can cause damage to the leash, as well as to the animal.

With reference to skateboards and surfboards, either for training purposes or for specific tricks that are done by skateboard and surfboard riders, it is desirable to have a leash attached to the front tip of the board. If the user decided to release the leash, it would either drag on the ground or in the water. In the case of a skateboard, this would be dangerous since the leash could get caught in the wheels and in the case of a surfboard, it would be undesirable.

OBJECTS OF THE INVENTION

It is the object of the present invention to provide a retractable-extendable leash, which at all times can be fixedly attached to the collar of an animal or to the front of a skateboard or surfboard.

It is a further object of the invention to provide an extendable-retractable leash which is rugged, light weight, easily constructed and small enough to remain at all times on an animal's collar or on a surfboard or skateboard without, in any way, being in the way of the handler or the rider.

These and other objects of the invention are achieved by providing a leash having a high strength cable with means at one end for attachment to an animal collar or to a surfboard or skateboard and a handle assembly at the other end. Built into the hand assembly is a coil spring which tends to roll up the leash cable inside the central portion of the handle assembly. The handle is manufactured in two parts so that the spring can be inserted and the two parts fixedly attached together around the spring in the simplest of manners. In addition, the two portions of the handle are designed in such a way that the retractable cable will slide in and out easily without catching or snagging.

This invention is an improvement on the invention described in my copending application serial No. 06/887,538, in that the manner in which the cable is attached to the spring provides greater freedom to the end of the cable which considerably increases its life and its resistance to metal fatigue and fraying or breaking.

BRIEF DESCRIPTION OF THE DRAWINGS

FIG. 1 is a perspective view of the retractable leash shown in accordance with the present invention.

FIG. 2 is a cross sectional view taken along lines 2—2 of FIG. 1.

FIG. 3 is an exploded perspective view of the invention.

FIG. 4 is a front view of the spring portion of the device.

DETAILED DESCRIPTION OF THE DRAWINGS

The leash of the present invention comprises a handle assembly 1 as illustrated in FIGS. 1-4 and a high strength cable 2. The cable 2 is attached to any convenient means 3 for attaching the cable to an animal collar or to a skateboard or surfboard. This can be a ring or a carriage bolt, a snap clip or any other type of attachment device, and usually one that will swivel to provide freedom of movement.

The handle assembly comprises a coiled leaf spring 4 with its outermost end fixedly attached to a circular band 5, in any convenient manner such as spot welding, notching or with a rivet 6, in such a manner that the outermost end of the leaf spring 4, attaches to the circular band 5, which completely surrounds, 360 degrees, the spring 4. The band 5, provides a base for the cable 2, to roll onto when retracting.

The cable 2, is held between the outermost coil of the spring 4, and the inside of the band 5, by the end of the cable 2, being fixedly attached to a bar 7, which is held between the outermost loop of the spring 4, and the band 5. A hole 8, is provided in the band 5, for passage of the cable 2, from its connection to the bar 7, through the band.

The bar 7, which is held between the outermost loop of the spring 4, and the inner surface of the band 5, is totally free in that it is not attached to either the spring or the band in any manner. It is held only by the pressure between the outermost loop of the spring 4, and the inner surface of the band 5, which holds the bar 7, in place. This freedom of the bar allows the bar to swivel as the cable may be pulled in various directions out of the handle asembly. As the bar swivels along with the cable, depending on how it is being pulled by the operator, it obviously allows the cable to swivel along with the bar so that the cable itself is not being bent back and forth constantly. If the bar were in a fixed position, movement of the cable would simply cause metal fatigue due to constant bending, at the point where the cable was attached to the bar. The rotation of the bar allows the bar to swivel with the cable and, therefore, the bending does not occur. In this manner the life of the cable is extended tremendously from prior methods.

In addition, the manner in which the bar is placed, so that the bar 7, presses against the inside surface of the band 5, across the entire width of the band 5, and the bar 7, displaces the pressure and load across the inside face of the band 5. The band 5, then presses against the inside face of the housing assembly and the pressure is further dissipated across the entire inside surface of the handle assembly itself and transferred down the sides of the walls of the assembly to the handles. This is extremely important in increasing the life of the leash, and is accomplished because the spring 4, which is inside of the handle assembly, is a floating spring, and thus, as the cable 2, is extended, it actually pulls the entire spring assembly against the inside surface of the handle assembly. When the handle assembly is made of plastic, which is the preferred material, the stress of the pulling of the cable is placed against the entire inside surface of the handle assembly and the stress is not placed on the center pivot post 13. One of the problems encountered by prior retractable leash assemblies is that the entire pulling stress of the cable was placed against the center post to which the spring was attached, causing that center post to easily break or break after continued use. As stated, in this case, applicant has devised a method whereby very little pressure is put on the center post because the pressure is dissipated by the pressing of the outer surface of the spring and band against the inside surface of the handle relieving the pressure on the center post.

A recess 39, in the handle assembly 23, into which center post 13, fits, when the two portions of the handle are assembled, gives added strength to the entire unit since when the post fits into recess 39, it has a much more secure fitting.

An additional advantage which applicant has been able to achieve in producing the leash in the manner described is that the completed leash is made in the smallest size that can be accomplished considering the size of the spring involved. It is critical in manufacturing a leash which is to remain at all times affixed to the collar of an animal or at all times affixed to the end of a skateboard that it be made as small as possible in order to avoid inconvenience for the animal or for the user. The construction described in this application has accomplished that end by making the entire assembly as small and light weight as could possibly be accomplished.

The innermost end 9, of the spring 4 is bent at a right angle with respect to the leaf coil.

The handle assembly comprises a hollow cylindrical element 10 having an end wall 11, an outer handle 12 extending from wall 11 outwardly and an inner slotted cylinder shaft 13 extending inwardly from the end wall 11. The slot 14 in the slotted cylinder shaft 13 is adapted to receive the right angle bend 9 of the spring 4, thereby providing a rotational restraint to the innermost end 9 of the leaf spring 4.

V shaped slots 15 and 16 are cut 180 degrees apart in the cylindrical element 10 to provide for ease of assembly of the handle as will be explained. The V shaped slots 15 and 16 terminate in rectangular holes 17 and 18, one of which will provide the passage for the cable 2 and the other one of which will provide a drain hole in case any water gets into the interior of the handle 1.

Interior blocks 19, and a similar block at the top near hole 17, abut the inner wall 11 of the cylindrical element 10 and abut the end of the rectangular holes 17 and 18 to provide structural strength when the two parts of the handle are put together.

The handle assembly further comprises a second hollow cylindrical element 21 whose outside diameter is equal to that of the outside diameter of the first hollow cylindrical element 10. Hollow cylindrical element 21 has an end wall 22 and a hollow cylindrical handle extension 23 which can, if desired, be made of transparent plastic. Both cylindrical extension elements 12 and 23 may be hollow or solid and if hollow may be used for the insertion of an identification tag 24 or any other information that the user determines to place into the hollow cylinders 12 or 23. Plugs 25 and 26, having slots such as 27, frictionally fit into the open end of handles 23 and 12. These plugs can be removed by a finger nail in slot 27 or the plugs 25 and 26 can be made to screw into or otherwise affix into the end of handles 23 and 12.

The surfaces of extension handles 23 and 12 are splined to give better finger grips on both handle portions.

Hollow cylindrical element 21 has an outer diameter rim 29 which fits against the inside edge 30 of cylindrical element 10. Cylindrical element 21 has an inside diameter rim 31 whose outer diameter is essentially equivalent to the inner diameter of cylindrical element 10.

Cylindrical element 21 also has a pointed protrusion 32 with a similar pointed protrusion 180 degrees on the opposite side of the rim 29, which is adapted to fit into the V shaped slots 15 and 16 of element 10. A cut out 33 with a similar cut out 180 degrees opposite is adapted to receive the rectangular block 19 and the corresponding block.

In this manner the two portions of the handle of the invention can be manufactured and put together by inserting the spring end 9 into the slot 14 and then pushing the two portions of the handle 10 and 21 together with the V shaped protrusions 32 and the one 180 degrees opposite of 32 fitting into the V shaped cut outs 15 and 16. In addition, since the two portions of the cylindrical elements 10 and 21 are identical in 180 degree phase, the handles can be put together in either direction and will fit properly. When the two portions of the handle 10 and 21 are pressed together, they are then sonically welded, when the product is made of plastic, along the rim created by the edge 29 and the edge 30 of the two portions. The device is also sonically welded along the outside edge 34 of cylindrical element 10 in order to give extreme structural strength to the entire unit. The unit ends up as one piece of hermetically sealed plastic with great strength.

Other methods of fastening the two portions of the device together are by an adhesive or any other convenient method. The spring 4 and cable 2 can be made of stainless steel to be rust proof. A self-lubricating plastic can be used to allow further ease of cable movement.

When the two portions 10 and 21 and fitted together, there remains 180 degrees apart open rectangular slots 17 and 18. Through one of these passes the cable 2 and the other one at the opposite end remains a hole for drainage of water should the handle be submerged in water.

A radius or curvature 35, 36, 37 and 38 at the neck of the handles 12 and 23 with the cylindrical elements 10 and 21 gives added strength to the unit.

The means for attaching the cable 2 to a pet collar can be any convenient method such as a split ring or an eye hook, any of which will have a swivel connection to the cable so that the link is free to rotate with respect to the cable, giving more freedom to the use of the leash.

In use, the pet owner attaches the cable to a ring on the animal's collar. He grasps the handle assembly and as the animal tries to pull away, the cable is unwound from the outer cylinder portion of the leaf spring, the inner portion of the leaf spring being coiled up tightly until the end of the cable comes up to the opening in the handle assembly. At this point, the animal's freedom of movement is restrained. Should the owner release the handle assembly, the leaf spring will pull the cable back into the central portion of the handle assembly. The handle assembly is fixedly attached to the animal's collar. Therefore, it always remains with him.

In use with a skateboard or surfboard, the cable is fixedly attached to the front edge of the board and the handle assembly retracts and sits at the front of the board. In the event the user wishes to grab the cable in order to have hand control, he simply reaches down and grabs the handle and extends the cable and if he is at a point where he no longer wishes it, he can release it and it will retract and sit at the front edge of the board.

While various changes may be made in the detail construction, it is understood that such changes will be within the spirit and scope of the present invention. This is defined by the appended claims.

I claim:

1. A leash comprising a cable, means for fastening said cable to the device on which it is to be used, a hollow handle assembly having a coiled leaf spring therein, a cylindrical band enclosing said leaf spring, said leaf spring having its outermost end fixedly attached to said cylindrical band and its innermost end attached to a cylindrical shaft of the handle asembly, a bar positioned between the outermost coil of said spring and said cylindrical band, said bar being held only by the pressure between the outermost coil of said spring and said cylindrical band, said cable being fixedly attached to said bar and said spring coiling up around said cylindrical shaft when said cable is unwound and said cable tending to be rewound around said cylindrical band by the spring action of said spring.

2. The leash of claim 1 further comprising a pair of hollow handle extensions.

3. The leash of claim 1 wherein the cable is attached to the device on which it is to be used by means of a swivel joint thereby providing freedom to rotate about the axis of the cable.

4. The leash of claim 1 in which the handle assembly is comprised of two hollow cylindrical elements having end walls and outer handle extensions.

5. The device of claim 4 in which a plurality of female slots are cut in one hollow cylindrical element and a plurality of male protrusions are provided in the opposite hollow cylindrical element adapted so that the male protrusions and the female slots are adapted to fit together.

6. The device of claim 4 in which interior slanted blocks are provided which abut the inner wall of the cylindrical elements to provide added structural strength.

7. The device of claim 5 in which the female slots terminate in a rectangular holes, one of which is adapted for passage of the cable and the other of which is adapted as a drain hole.

8. The device of claim 6 in which the interior blocks have slanted and curved surfaces to provide for ease of passage of the cable.

9. The device of claim 7 in which the rectangular holes have curved edges to provide for ease of passage of the cable.

10. The device of claim 4 in which the extension handles are splined for better gripping surfaces.

11. The device of claim 4 in which the two cylindrical portions are sonically welded together after assembly.

12. The device of claim 4 in which a radius is provided at the neck of the connection between the extension handles and the cylindrical elements to give added strength.

13. A leash comprising a cable, means for fastening said cable to the device on which it is to be used, a hollow handle assembly comprising a pair of oppositely opposed hollow cylindrical elements having end walls and outer handle extensions, said handle assembly also comprising a central cylindrical shaft, a coiled leaf spring adapted to be held inside of the hollow handle assembly, said leaf spring having its outermost end fixedly attached to said cylindrical band and its innermost end attached to said cylindrical shaft, a bar positioned between the outermost coil of said spring and said cylindrical band, said bar being held only by the pressure between the outermost coil of said spring and said cylindrical band, said cable being fixedly attached to said bar and said spring coiling up around said cylindrical shaft when said cable is unwound and said cable tending to be rewound around said cylindrical band by the spring action of said spring.

14. The device of claim 13 in which a plurality of female slots are cut in one hollow cylindrical element and a plurality of male protrusions are provided in the opposite hollow cylindrical element, adapted so that the male protrusions and the female slots are adapted to fit together.

15. The device of claim 13 in which interior blocks are provided which abut the inner wall of the cylindrical elements to provide added structural strength.

16. The device of claim 13 in which the female slots terminate in rectangular holes, one of which is adapted for passage of the cable and the other of which acts as a drain hole.

17. The device of claim 15 in which the interior blocks have slanted and curved surfaces to provide for ease of passage of the cable.

18. The device of claim 16 in which the rectangular holes have curved edges to provide for ease of passage of the cable.

19. The device of claim 13 in which the extension handles are splined for better gripping surfaces.

20. The device of claim 13 in which the two cylindrical portions are sonically welded together after assembly.

21. The device of claim 13 in which a radius is provided at the neck of a connection between the extension handles and the cylindrical elements to give added strength.

* * * * *